United States Patent
Goyal et al.

(10) Patent No.: US 11,983,828 B2
(45) Date of Patent: *May 14, 2024

(54) SYSTEMS AND METHODS FOR AUTOMATED INSERTION OF SUPPLEMENTAL CONTENT INTO A VIRTUAL ENVIRONMENT USING A MACHINE LEARNING MODEL

(71) Applicant: Rovi Guides, Inc., San Jose, CA (US)

(72) Inventors: Aashish Goyal, Bengaluru (IN); Ajay Kumar Mishra, Karnataka (IN); Jeffry Copps Robert Jose, Tamil Nadu (IN)

(73) Assignee: ROVI GUIDES, INC., San Jose, CA (US)

( * ) Notice: Subject to any disclaimer, the term of this patent is extended or adjusted under 35 U.S.C. 154(b) by 172 days.

This patent is subject to a terminal disclaimer.

(21) Appl. No.: 17/572,826

(22) Filed: Jan. 11, 2022

(65) Prior Publication Data

US 2022/0245901 A1  Aug. 4, 2022

Related U.S. Application Data

(63) Continuation of application No. 16/940,982, filed on Jul. 28, 2020, now Pat. No. 11,250,634.

(51) Int. Cl.
| | |
|---|---|
| G06T 19/00 | (2011.01) |
| G06F 18/214 | (2023.01) |
| G06N 20/00 | (2019.01) |
| G06Q 30/0241 | (2023.01) |
| G06Q 30/0251 | (2023.01) |

(52) U.S. Cl.
CPC ......... *G06T 19/006* (2013.01); *G06F 18/214* (2023.01); *G06N 20/00* (2019.01); *G06Q 30/0271* (2013.01); *G06Q 30/0277* (2013.01)

(58) Field of Classification Search
CPC ........ G06T 19/006; G06N 20/00; G06F 18/24
See application file for complete search history.

(56) References Cited

U.S. PATENT DOCUMENTS

| | | | |
|---|---|---|---|
| 2019/0213438 A1 | 7/2019 | Jones et al. | |
| 2019/0377944 A1* | 12/2019 | Chen | .............. G06T 7/136 |
| 2019/0377949 A1* | 12/2019 | Chen | ............ G06F 18/217 |
| 2020/0026278 A1 | 1/2020 | Khanna et al. | |
| 2021/0027083 A1 | 1/2021 | Cohen et al. | |

* cited by examiner

*Primary Examiner* — Grace Q Li
(74) *Attorney, Agent, or Firm* — HALEY GUILIANO LLP

(57) ABSTRACT

Insertion of supplemental content into a virtual environment is automated using a machine learning model. The machine learning model is trained to calculate a confidence value that a candidate virtual object fits into a virtual environment based on an input that includes a candidate virtual object, a list of persistent virtual objects, and a list of temporary virtual objects. The machine learning model is trained using the persistent and temporary objects displayed in the current virtual environment until it predicts that a selected virtual object fits into the current virtual environment. The trained machine learning model is then used to select a virtual object comprising supplemental content to be inserted as a new virtual object in the virtual environment.

20 Claims, 9 Drawing Sheets

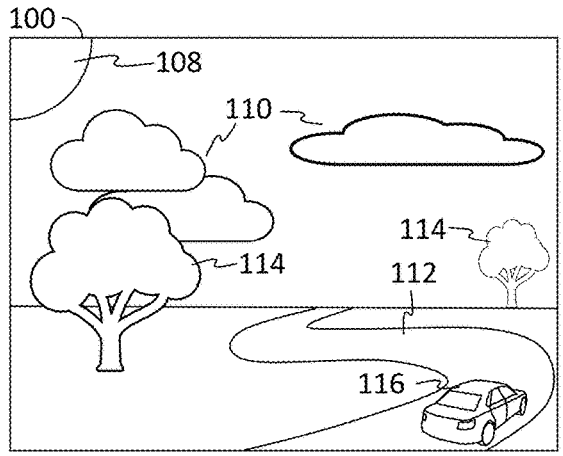
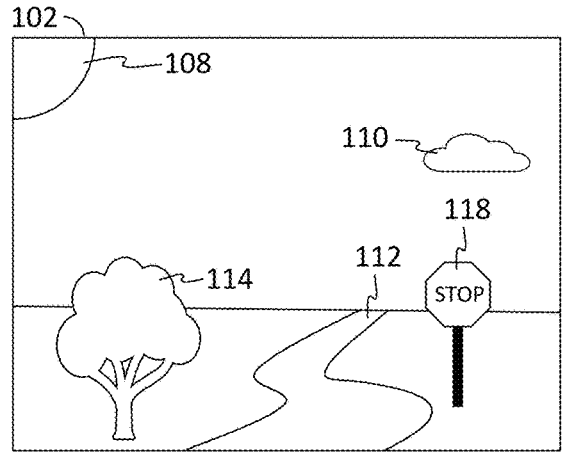
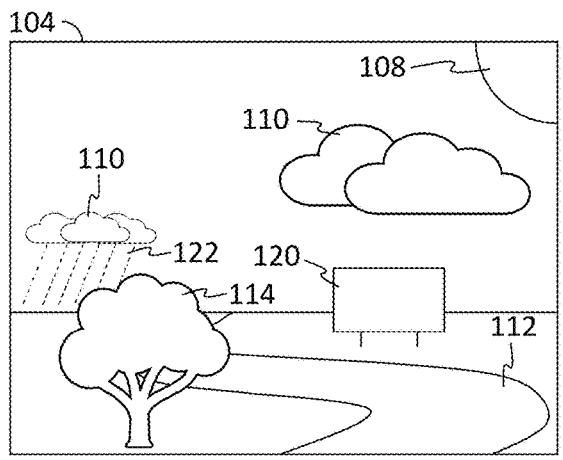
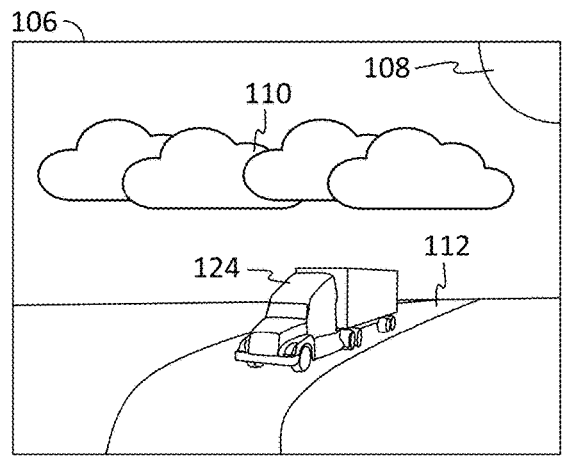

Persistent Objects:
 Sun
 Cloud
 Road

Temporary Objects:
 Car
 Stop sign
 Billboard
 Truck
 Tree
 Rain

| Candidate Object | Persistent Objects | Temporary Objects | Percent Confidence |
|---|---|---|---|
| Car | Sun; cloud; road | Stop sign; billboard; truck; tree; rain | 100% |
| Stop sign | Sun; cloud; road | Car; billboard; truck; tree; rain | 100% |
| ⋮ | ⋮ | ⋮ | ⋮ |
| Tree | Sun; cloud; road | Car; stop sign; billboard; truck; rain | 100% |
| Rain | Sun; cloud; road | Car; stop sign; billboard; truck; tree | 100% |

Sun
302 {
- Type: Persistent
- Class: Natural
- Family: Sky
- Genus: Star
- Species: Local sun

Cloud
304 {
- Type: Persistent
- Class: Natural
- Family: Sky
- Genus: Weather
- Species: Cloud

Road
306 {
- Type: Persistent
- Class: Artificial
- Family: Surface
- Genus: Street
- Species: Country road
- Texture: Pavement

308

Car
310 {
- Type: Temporary
- Class: Artificial
- Family: Vehicle
- Genus: Private vehicle
- Species: Sedan

Stop sign
312 {
- Type: Temporary
- Class: Artificial
- Family: Sign
- Genus: Road sign
- Species: Stop sign

Billboard
314 {
- Type: Temporary
- Class: Artificial
- Family: Sign
- Genus: Road Sign
- Species: Advertising

Truck
316 {
- Type: Temporary
- Class: Artificial
- Family: Vehicle
- Genus: Commercial vehicle
- Species: 18-wheeler

Tree
318 {
- Type: Temporary
- Class: Natural
- Family: Living
- Genus: Plant
- Species: Tree

Rain
320 {
- Type: Temporary
- Class: Natural
- Family: Sky
- Genus: Weather
- Species: Precipitation(liquid)

FIG. 3

SYSTEMS AND METHODS FOR AUTOMATED INSERTION OF SUPPLEMENTAL CONTENT INTO A VIRTUAL ENVIRONMENT USING A MACHINE LEARNING MODEL

CROSS-REFERENCE TO RELATED APPLICATION

This application is a continuation of U.S. patent application Ser. No. 16/940,982, filed Jul. 28, 2020, the disclosure of which is hereby incorporated by reference herein in its entirety.

BACKGROUND

This disclosure is directed to automated insertion of supplemental content into a virtual environment. In particular, techniques are disclosed for utilizing a machine learning model for deciding which supplemental content items to insert into a particular virtual environment.

SUMMARY

Virtual environment systems, including virtual reality and augmented reality systems, process and display virtual objects according to parameters set within the virtual environment. These virtual objects are often predefined objects, or one of a small group of objects that can be displayed at a particular location within the virtual environment. In one approach, if insertion of supplemental content is desired, only a predefined object may be placed in a location in the virtual environment that is explicitly marked as suitable for the display of that type of supplemental content. For example, a virtual environment may include a blank sign post placed in a specific location within the virtual environment and explicitly marked as a surface on which supplemental content can be displayed. Then, when insertion of supplemental content is desired, it is displayed at the location of the blank sign. In another approach, systems may allow for the insertion of supplemental content in the form of a new virtual object, but the inclusion of the new virtual object may be incongruous with, or seem out of place in, the current virtual environment.

Systems and methods are described herein for automated insertion of supplemental content into a virtual environment using a machine learning model. Using a machine learning model allows highly accurate predictions of suitable virtual objects that can be added to the virtual environment. A machine learning model can be trained to make such predictions by observing the temporary virtual objects that appear in the virtual environment in the context of the persistent virtual objects that define the overall virtual environment. The trained machine learning model can then accurately predict if a new virtual object is suitable for insertion into the virtual environment. In other words, known data can be leveraged, via the machine learning model, to predict the suitability of new data.

A first plurality of persistent virtual objects displayed in a plurality of consecutive virtual environment frames are identified, as well as a second plurality of temporary virtual objects displayed in some, but not all, of the plurality of consecutive virtual environment frames. A first virtual object is selected from the plurality of consecutive virtual environment frames. A machine learning model is then trained to calculate a confidence value that a candidate virtual object fits into a virtual environment based on an input that includes a candidate virtual object, a list of persistent virtual objects, and a list of temporary virtual objects. The machine learning model is trained using the identified persistent and temporary objects until it predicts that the selected first virtual object fits into the current virtual environment.

Once the machine learning model is trained, a candidate object comprising supplemental content is retrieved for insertion into the virtual environment. The machine learning model is then used to determine whether the candidate object fits into the current virtual environment with sufficient confidence. If so, the candidate object is inserted. If not, other candidate objects may be considered, or the system may wait for additional objects to be identified and refine the machine learning model.

To identify the plurality of persistent virtual objects and the plurality of temporary virtual objects, all virtual objects in a first virtual environment frame may be identified as persistent virtual objects. The list of persistent virtual objects is then compared with all virtual objects in a subsequent frame of the plurality of consecutive virtual environment frames. If an object identified as a persistent object is not displayed in the particular virtual environment frame, that object is reidentified as a temporary object. If an object displayed in the particular virtual environment frame is not included in the list of persistent virtual objects, the object is identified as a temporary virtual object.

A virtual environment frame may comprise all virtual objects in a field of view on a display on which the virtual environment is generated. The field of view may be defined as a portion of a circle around a current point of view in the virtual environment. For example, the field of view may be narrow (such as 30 degrees), full (such as 180 degrees), or wide (greater than 180 degrees) such that the defined field of view includes virtual objects that are not currently visible to a user of the virtual environment. For example, the virtual environment may include a road, and the field of view may be wide enough to include a vehicle driving on the road behind the user. A weight may be assigned to each virtual object, and objects that are visible to the user may be given more weight than objects that are not visible to the user, despite being in the defined field of view. Each virtual object, both persistent and temporary, may comprise object attributes or other metadata that describe the respective virtual object. When retrieving a candidate object for insertion into the virtual environment, a database of supplemental content items may be accessed. Each of the supplemental content items in the database may have content attributes or other metadata that describe the supplemental content. A plurality of attributes of each persistent virtual object and each temporary virtual object are identified, and it is determined whether at least one content attribute of a supplemental content item matches at least one of the identified object attributes. If so, the supplemental content item is selected as a candidate object for insertion.

To keep the machine learning model up-to-date as the virtual environment changes, a list of virtual objects displayed from a first time to a current time may be maintained. Maintaining an up-to-date listing of both temporary and persistent virtual objects for use as input into the machine learning model helps to ensure that the machine learning model accurately predicts the suitability of a given virtual object for insertion into the virtual environment. This list may be used as an input data set against which a candidate object is compared. When retrieving a candidate object from the supplemental content database, content attributes of each supplemental content item may be compared against the object attributes of only those virtual objects that have been displayed between the first time and the current time. For example, the system may maintain a list of all virtual objects displayed in the past ten minutes, even if the virtual environment has been continuously displayed for a longer period of time.

Retrieving a candidate object may also be achieved by identifying a plurality of available virtual objects, such as from a library of virtual objects related to the current virtual environment. A time at which each available virtual object was last displayed can be determined, and a weight assigned to each available virtual object based on the amount of time that has passed between the time the virtual object was last displayed and the current time. For example, if a particular virtual object was displayed recently, such as in the last one minute, it may be assigned a higher weight than a virtual object that was last displayed several minutes ago. The candidate object having at least one content attribute matching the virtual object having the highest weight is then selected.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1 shows several illustrative virtual environment frames, persistent and temporary virtual objects displayed in those frames, and a training data set for training a machine learning model, in accordance with some embodiments of the disclosure;

FIG. 3 shows an illustrative set of virtual object attributes for both persistent and temporary virtual objects identified in FIG. 1, in accordance with some embodiments of the disclosure;

DETAILED DESCRIPTION

Figure 2:
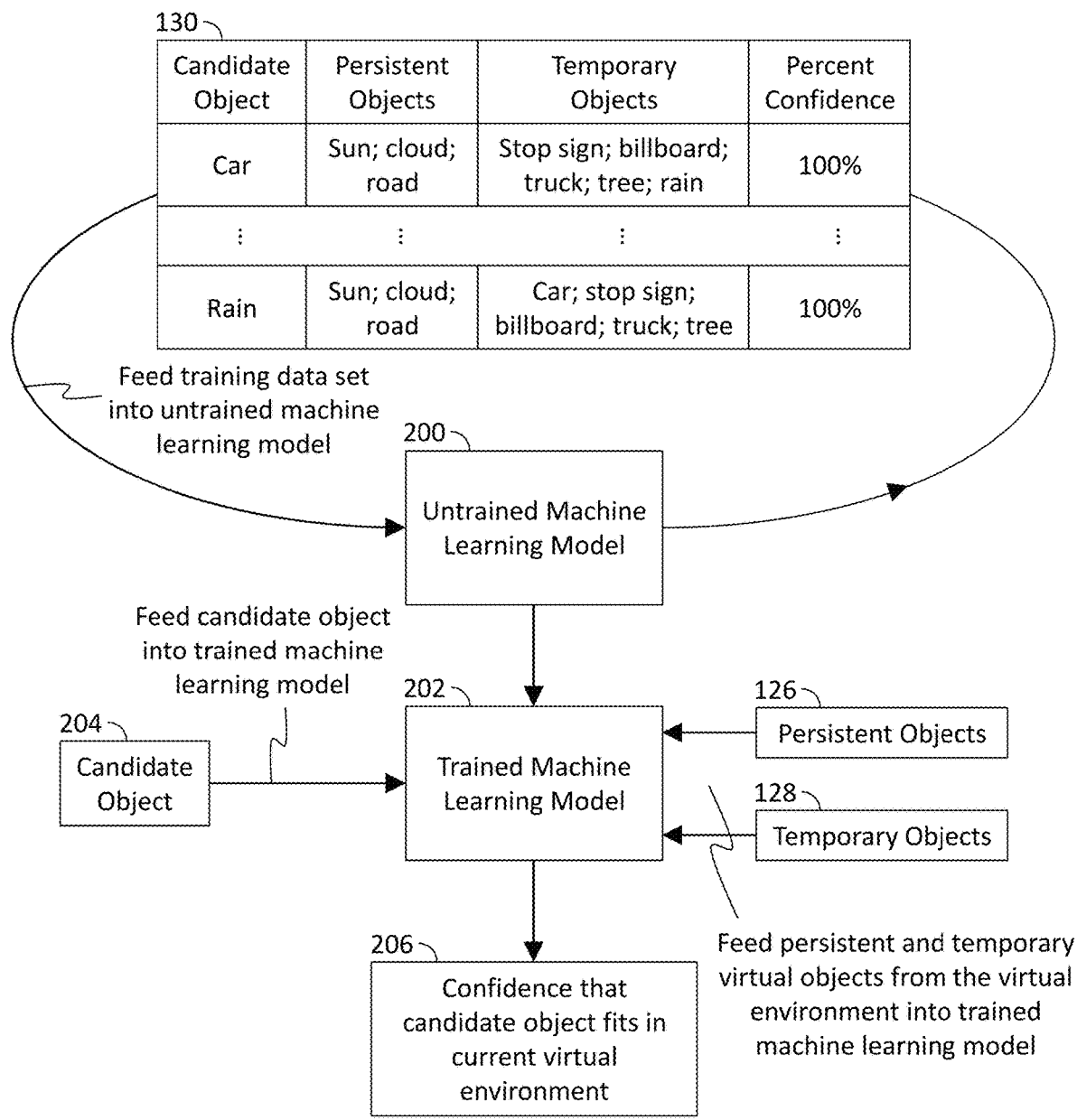
FIG. 2 is a block diagram representing training of a machine learning model and use of the machine learning model to determine whether a candidate object fits in a virtual environment, in accordance with some embodiments of the disclosure.

FIG. 1 shows several illustrative virtual environment frames 100, 102, 104, and 106. While depicted in two dimensions, it is noted that the virtual environment represented by virtual environment frames 100, 102, 104, and 106 can be a three-dimensional environment. Each virtual environment frame represents a field of view on a display device on which the virtual environment is generated. For example, a virtual environment frame may be a representation of a 360-degree environment. Each virtual environment frame includes a number of virtual objects. Each virtual environment frame may include visual information, and/or vector information describing the movement of various virtual objects depicted in the virtual environment. The virtual environment described by the virtual environment frames may be a fully artificial environment, such as a video game or other immersive content. For example, a head-mounted three-dimensional display unit may be used to display the virtual environment to a user. The display unit or other physically or wirelessly connected sensors or other components may track movements of the user, and those movements are used to drive generation of the virtual environment on the display unit. For example, an accelerometer unit may track the movement of the user's head, which in turn causes the display unit to shift display of the virtual environment in the direction of the movement such that if the user's head turns to the right, virtual objects placed to the right of the user's position within the virtual environment are brought into the user's field of view. The virtual environment may also be an augmented reality environment, which tracks the real-world surroundings of a user and overlays virtual objects onto those surroundings. For example, one or more cameras or other imaging sensors may be integrated into, or physically or wirelessly connected to, a display unit to gather visual information representing a user's surroundings.

Some virtual objects are persistent, meaning that they appear in multiple consecutive virtual environment frames. Persistent virtual objects (e.g., objects that appear in all virtual environment frames over a period of time, such as one minute or one hour) may be objects used to depict a particular setting or location. For example, if the virtual environment is meant to be located on a beach, persistent virtual objects may include an ocean, sand, palm trees, and other objects that may always be visible in such a location. Other virtual objects are temporary, meaning that they appear in some, but not all, virtual environment frames. Continuing the above example, temporary objects may include boats in the ocean, beach chairs, towels, or other virtual objects that may appear on a beach but are not always present.

In the example of FIG. 1, the virtual environment is a country road. Based on virtual environment frames 100, 102, 104, and 106, several virtual objects can be identified as persistent virtual objects, and others can be identified as temporary virtual objects. Sun 108, for example, appears in all four virtual environment frames, and is thus considered a persistent object. Similarly, clouds 110 also appear in every virtual environment frame. While not necessarily the exact same cloud objects, the inclusion of at least one cloud object in each virtual environment frame may be sufficient to identify clouds 110 as a persistent virtual object. Road 112 also appears in each virtual environment frame and is therefore a persistent virtual object. Tree 114, car 116, stop sign 118, billboard 120, rain 122, and truck 124 each appear in less than all of virtual environment frames 100, 102, 104, and 106. These objects are therefore identified as temporary virtual objects.

The identified persistent objects may be tracked in a persistent object list 126. Similarly, the identified temporary objects may be tracked in a temporary object list 128. Persistent object list 126 and temporary object list 128 may be used to create training data set 130 for use in training a machine learning model to predict a level of confidence that a given candidate virtual object fits into a virtual environment given a set of persistent virtual objects displayed in the virtual environment and a set of temporary virtual objects displayed in the virtual environment. For example, each temporary object from temporary object list 128 may be used as a training candidate object, persistent object list 126 may be used as the set of persistent virtual objects, and the remaining objects from temporary object list 128 may be used as the set of temporary virtual objects. The machine learning model is then trained with a target of returning a confidence prediction for each candidate object to be near 100%. Training can be repeated until further training fails to improve the confidence prediction. The machine learning model may be a regression model, a gradient descent model, a gradient boost model, a random forest model, a recurrent neural network model, a discriminative neural network model, or any other suitable machine learning model.

FIG. 2 is a block diagram representing training of a machine learning model and use of the machine learning model to determine whether a candidate object fits in a virtual environment, in accordance with some embodiments of the disclosure. Training data set 130 is fed into untrained machine learning model 200. For example, the machine learning model may be a gradient boosted decision tree for classification, although one of skill in the relevant art will appreciate that other machine learning models may be used (e.g., other boosting techniques, logistic regression, artificial neural networks, nearest neighbors, support vector machine, etc.). Such model may learn and make decisions driven by data, without being explicitly programmed. In the gradient boosted decision tree for classification, an output value for one new weak learner (e.g., decision tree) may be added one at a time to the existing decision trees (e.g., stagewise additive modeling), to minimize loss of the model. In addition, a commonly used value of 0.1 for the learning rate (e.g., a parameter used to minimize loss of the model) is selected, although other values for the learning rate coefficient are possible. Various constraints may be set for the decision trees (e.g., maximum number of leaf nodes, number of trees to be constructed, etc.). A leaf node may be a node in the decision tree in which arrows point to the leaf node, but no additional arrows point away from such node. This results in trained machine learning model 202. Candidate object 204 is then fed into trained machine learning model 202, along with persistent object list 126 and temporary object list 128. Trained machine learning model 202 uses attributes of candidate object 204 and attributes of the virtual objects included in persistent object list 126 and temporary object list 128 to determine if candidate object 204 fits into the virtual environment. Trained machine learning model 202 outputs confidence level 206 that candidate object 204 fits into the virtual environment. Confidence level 206 may be expressed as a percentage (i.e., an integer between 0 and 100) or an equivalent decimal representation (i.e., a number between 0 and 1). A high confidence level indicates that candidate object 204 fits into the virtual environment and can thus be inserted into the virtual environment at a suitable location.

FIG. 3 shows an illustrative set of virtual object attributes for both persistent and temporary virtual objects identified in FIG. 1, in accordance with some embodiments of the disclosure. Virtual object attributes list 300 represents the attributes of each virtual object included in persistent object list 126. Referring to the example of FIG. 1, sun 108 is a persistent virtual object among consecutive virtual environment frames 100, 102, 104, and 106. Virtual object attributes 302 describe various attributes of sun 108. For example, sun 108 is of type "persistent," meaning it is a persistent object. Sun 108 is of class "natural," indicating that the virtual object represents an object that occurs in nature, and is of family "sky," further refining the class of objects that occur in nature represented by sun 108 to those objects that appear in the natural sky. Genus and species attributes further define sun 108 as a "star" and a "local sun," respectively. Cloud 110, representing an object that occurs naturally in the sky, has similar attributes 304 and is also of type "persistent," class "natural," and family "sky." Cloud 110 is further defined to be of genus "weather," and species "cloud." Road 112, having attributes 306, is also of type "persistent," but is of class "artificial" as it represents a man-made structure. Road 112 is of family "surface," indicating that it is an object that can only be laid onto another object. In this case, road 112 can only be laid onto the ground. Road 112 is of genus "street" and species "country road." These attributes may be used during display of the virtual environment to determine the types of vehicles to display on road 112 or display of other related virtual objects. Road 112 also has an additional attribute "texture" which is defined as "pavement." This attribute may be used during display of the virtual environment to render road 112 using a particular texture swatch or color scheme. It may also be used to determine whether certain types of road markings can be displayed on road 112. For example, painted lines can be displayed on a paved road, but not on a dirt or gravel road.

Temporary object attributes list 308 represents the attributes of each virtual object included in temporary objects list 128. Car 116 has object attributes 310, defining car 116 as being of type "temporary," meaning it is a temporary object, class "artificial," family "vehicle," genus "private vehicle" and species "sedan." Stop sign 118, billboard 120, truck 124, tree 114, and rain 122 are similarly defined by object attributes 312, 314, 316, 318, and 320, respectively. Each object attribute is used to train the machine learning model to predict the types of objects that fit in a virtual environment. Candidate objects also have similar attributes associated with them, and the machine learning model, once trained, uses those attributes to determine whether the candidate object will fit into the virtual environment.

Figure 4:
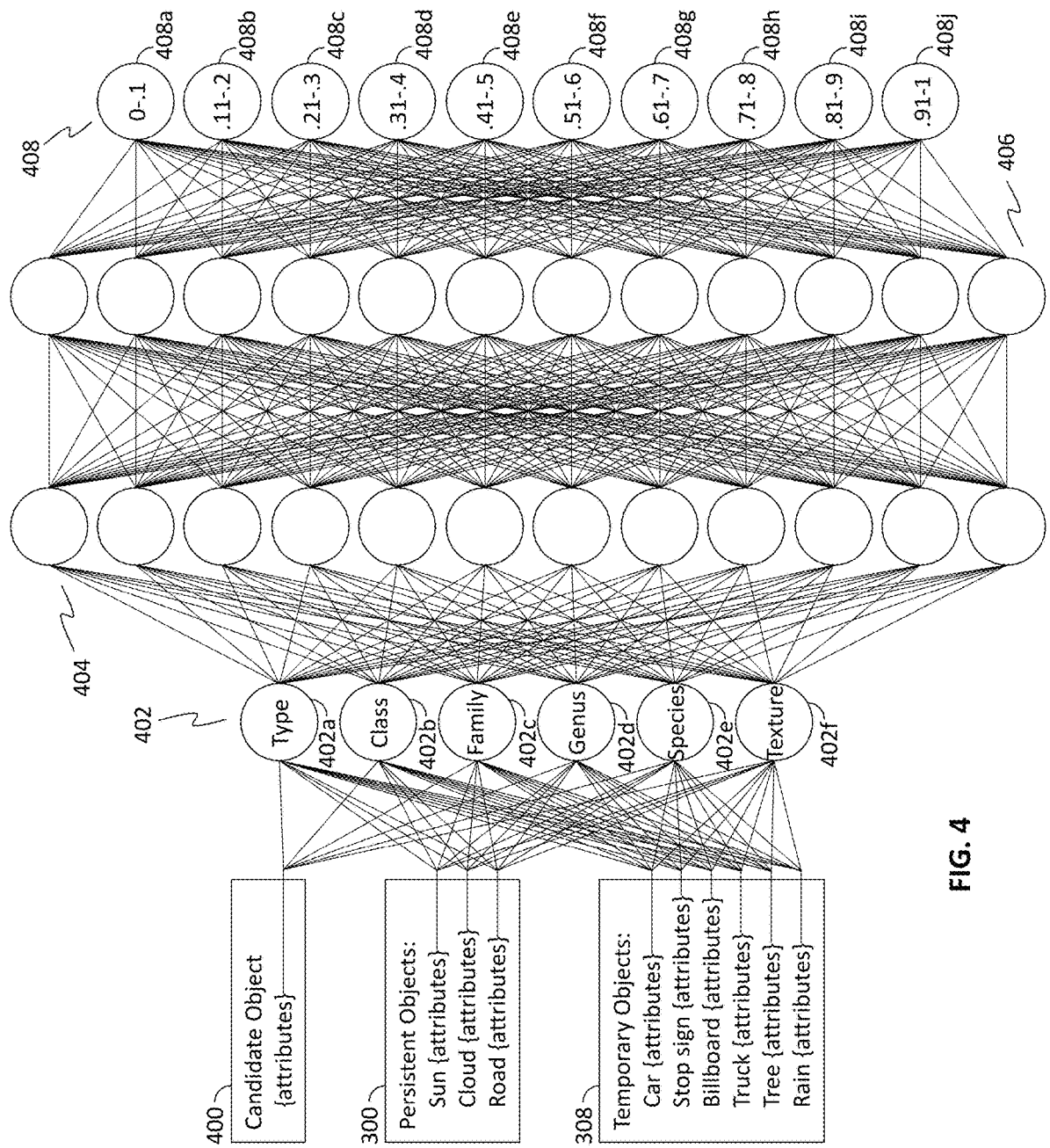
FIG. 4 represents an illustrative machine learning model that takes as input a candidate object, a set of persistent objects and a set of temporary objects and returns a confidence level that the candidate object fits in a virtual environment comprising the set of persistent objects and the set of temporary objects, in accordance with some embodiments of the disclosure.

FIG. 4 represents an illustrative machine learning model that takes as input a candidate object, a set of persistent objects and a set of temporary objects and returns a confidence level that the candidate object fits in a virtual environment comprising the set of persistent objects and the set of temporary objects, in accordance with some embodiments of the disclosure. To determine a confidence level that a particular candidate object fits in a virtual environment, the machine learning model takes as input candidate object 400, persistent objects list 300, and temporary objects list 308. Attributes of the candidate object, each persistent object, and each temporary object are fed into input layer 402. In some embodiments, a word embedding model, such as Word2Vec, is applied to the attributes to generate corresponding vectors for input into the machine learning model. Input layer 402 includes nodes 402a-402f corresponding to different attributes of each object. For example, node 402a corresponds to the "type" attribute, node 402b corresponds to the "class" attribute, and so on. The input attributes are processed through one or more hidden layers of the machine learning model. In the example of FIG. 4, two hidden layers 404 and 406 are included in the machine learning model, though any number of hidden layers may be used. Output layer 408 includes ten nodes 408a-408j, one for each of ten ranges of confidence that the candidate object fits into the virtual environment that includes the input persistent objects and temporary objects. The machine learning model may calculate a confidence value, such as 0.63, resulting in a single corresponding output node, such as node 408g, being activated.

Figure 5:
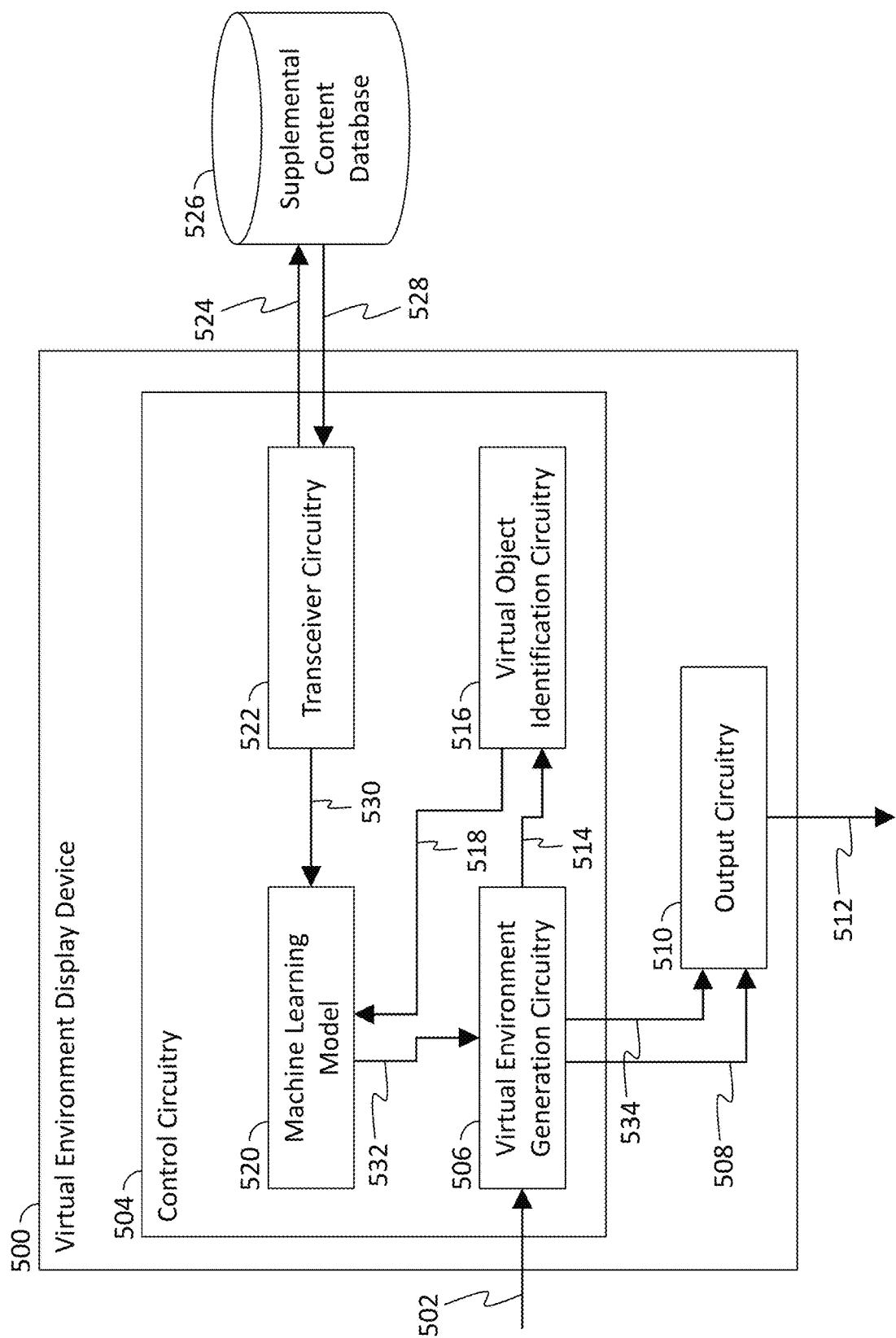
FIG. 5 is a block diagram representing components and data flow therebetween of a virtual environment display device that employs a machine learning model, in accordance with some embodiments of the disclosure.

FIG. 5 is a block diagram representing components and data flow therebetween of a virtual environment display device 500 that employs a machine learning model, in accordance with some embodiments of the disclosure. Virtual environment display device 500 receives 502 virtual environment data, such as a media stream comprising three-dimensional media or a set of virtual objects and associated display parameters. The virtual environment data is processed by control circuitry 504 using virtual environment generation circuitry 506. Control circuitry 504 may be based on any suitable processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Virtual environment generation circuitry 506 processes the virtual environment data to generate virtual environment frames that visually represent the virtual environment described by the virtual environment data. Virtual environment generation circuitry 506 then transmits 508 the virtual environment frames to output circuitry 510. Output circuitry 510 may comprise any suitable circuitry for driving a display based on a display signal. Output circuitry 510 transmits 512 the display signal to a display device.

During display of the virtual environment, virtual environment generation circuitry transmits 514 virtual environment data to virtual object identification circuitry 516. Virtual object identification circuitry 516 identifies, from within the virtual environment data, virtual objects displayed in each virtual environment frame. Virtual object identification circuitry 516 may extract from the virtual environment data metadata describing each virtual object, which may include object attributes such as those described above in connection with FIG. 3. Virtual object identification circuitry 516 may store and maintain a list of persistent virtual objects and associated attributes, and a list of temporary virtual objects and associated attributes. The virtual object attributes associated with each virtual object may be dynamically identified by virtual object identification circuitry 516, for example, using image processing and object recognition techniques as are known in the art, or may be extracted from metadata or other information contained in the virtual environment data.

Virtual object identification circuitry 516 transmits 518 the list of persistent virtual objects and the list of temporary virtual objects identified by virtual object identification circuitry 516 to machine learning model 520. Machine learning model 520 is trained, using the identified persistent virtual objects and temporary virtual objects, to calculate a confidence that a particular candidate object fits in the virtual environment. To train machine learning model 520, each temporary virtual object is selected, in turn, as a candidate object. The remaining temporary objects and the persistent virtual objects are fed into machine learning mode 520 as the entirety of virtual objects displayed in the virtual environment. Machine learning model 520 is then trained until the calculated confidence that each identified temporary object, when input as a candidate object, reaches 100%, or a further training fails to improve the confidence level of each candidate object.

The identified temporary virtual objects and persistent virtual objects are used as a training set for machine learning model 520. Such a training set is used to build the machine learning model. As a non-limiting example, machine learning model 520 may be a gradient boost model, although one of skill in the relevant art will appreciate that other machine learning models may be used (e.g., other boosting techniques, logistic regression, artificial neural networks, nearest neighbors, support vector machine, etc.). Such a model may learn and make decisions driven by data, without being explicitly programmed. In the gradient boosted decision tree for classification, an output value for one new weak learner (e.g., decision tree) may be added one at a time to the existing decision trees (e.g., stagewise additive modeling), to minimize loss of the model. For example, while a small number of decision trees are weak learners in the gradient boosting model, many more decision trees may be used in the training process (e.g., potentially thousands of decision trees, where each tree contributes a particular weight of the predicted value). In addition, a commonly used value of 0.1 is used for the learning rate (e.g., a parameter used to minimize loss of the model) is selected, although other values for the learning rate coefficient are possible. Various constraints may be set for the decision tress (e.g., maximum number of leaf nodes, number of trees to be constructed, etc.). A leaf node may be a node in the decision tree in which arrows point to the leaf node, but no additional arrows point away from such node.

Control circuitry 504 or machine learning model 520 may construct a decision tree using a first parameter (e.g., family similarity >0.8) and a second parameter (e.g., class difference <0.4) for the training data. In constructing the model, an initial prediction is made, and such initial prediction may be based on a logarithm of the odds computed for an initial leaf based on the training data, e.g., using the following formula:

$$\log\left(\frac{2 \text{ match decisions in the training set}}{2 \text{ no match decisions in the training set}}\right) = 0 \quad \text{(Eq. 1)}$$

Based on such log(odds) value, the control circuitry utilizes a logistic function to obtain a probability (e.g., 0.5 as an initial prediction). Based on such initial prediction, residual values are computed for each training example, where the Residual value is equal to the difference of the Observed Probability and the initial prediction). For example, residual value $R_1$ for a first training example may be 0.5 (e.g., 1−0.5, where 1 represents that a match was observed in the labeling of the training example, and 0.5 is the initial prediction).

Residual values $R_1$, $R_2$, $R_3$, $R_4$ are calculated for each training example, and the decision tree is built based on the labels of the training example. For example, the first training example has a family similarity greater than 0.8, and thus the residual value $R_1$ for such training example is assigned to the leaf in the decision tree reflecting such feature, and each of the residuals is similarly assigned to leaves corresponding to the features scores of the respective training examples. Output values for each of the leaves in the tree may then be calculated (e.g., using the following formula):

$$\text{Output Value}(Leaf_i) = \frac{\Sigma\, Residual_i}{\Sigma\, Previous\ Probability_i} \times (1 - Previous\ Probability_i) \quad \text{(Eq. 2)}$$

To obtain a new prediction for the model, the initial leaf is combined with the decision tree. For example, the initial logarithm of the odds (e.g., 0) is added to a learning rate coefficient (e.g., 0.1) which is used to scale the output value of the tree, which for the first training example yields a value of 0.2. Such value is input to the logistic function to obtain a predicted probability, such as 0.55, and the predicted probabilities for the remaining training examples are computed.

After obtaining the predicted probabilities based on the first tree, machine learning model 520 may sequentially construct a series of other decision trees including (e.g., based on similar or different parameters, such as based on a species parameters and genus overlap parameters). The above-described process may then be repeated in order to obtain residual values for the decision tree, and the output values for each leaf in the decision tree are computed and added in combination with the output values of the first tree to obtain a new predicted value (e.g., 0.57 for the first training example). Such process may be repeated by the control circuitry in an iterative process until the parameter of the maximum number of trees to be constructed is met and/or the residuals become desirably small (e.g., until the model stabilizes). In some embodiments, the model utilizes trees having between 8 and 32 leaves, and a probability of 0.5 may be a threshold for determining that a training example constitutes a match. Once the model is trained, the model may be used as to determine whether a candidate object fits into a virtual environment. Various parameters or hyperparameters (e.g., a value set before the training process begins, such as number of nodes) may be utilized to evaluate and tune the model. For example, early stopping may be used to update decision trees to be a better fit with training data, and model validation techniques such as cross-validation may be used to test the model's predictions on new database records that were not used to train the model.

Once the model is trained, candidate objects comprising supplemental content may be evaluated for insertion into the virtual environment. Control circuitry 504, using transceiver circuitry 522, transmits 524 a request to supplemental content database 526 for objects comprising supplemental content. The supplemental content may be any content that may be tailored to a specific user based on user profile data or may include advertising information. Transceiver circuitry 522 may be a network connection such as an Ethernet port, WiFi module, or any other data connection suitable for communicating with a remote server. In response to the request, control circuitry 504 receives 528, using transceiver circuitry 522, at least one supplemental content item from supplemental content database 526. Alternatively or additionally, control circuitry 504 may receive a set of attributes associated with each supplemental content item. Transceiver circuitry 522 transmits 530 the received supplemental content items to machine learning model 520, where the supplemental content items, or their associated attributes, are input into machine learning model 520 as candidate objects to calculate a confidence that each supplemental content item fits into the virtual environment that includes the list of persistent virtual objects and the list of temporary virtual objects.

Machine learning model 520 calculates a confidence for each input candidate object. The candidate object having the highest confidence is then selected and transmitted 532 to virtual environment generation circuitry 506, which incorporates the selected candidate object into the virtual environment. Virtual environment generation circuitry 506 transmits 534 the virtual environment frame or frames containing the candidate object comprising the supplemental content to output circuitry 510, where it is transmitted for display.

If no candidate object has a confidence level above a threshold value, then no candidate objects are inserted. Control circuitry 504 may then wait a predefined period of time, such as five minutes, before again attempting to insert supplemental content. Alternatively, control circuitry 504 may monitor the list of persistent virtual objects and temporary virtual objects and attempt to insert supplemental content only when the lists of objects have changed by a threshold amount. For example, if two objects have been removed from the list of temporary objects and one new object has been added, control circuitry 504 may determine that there have been three changes to the list of temporary objects, while the threshold amount may be two changes. Thus, control circuitry 504 may again attempt to insert supplemental content.

Figure 6:
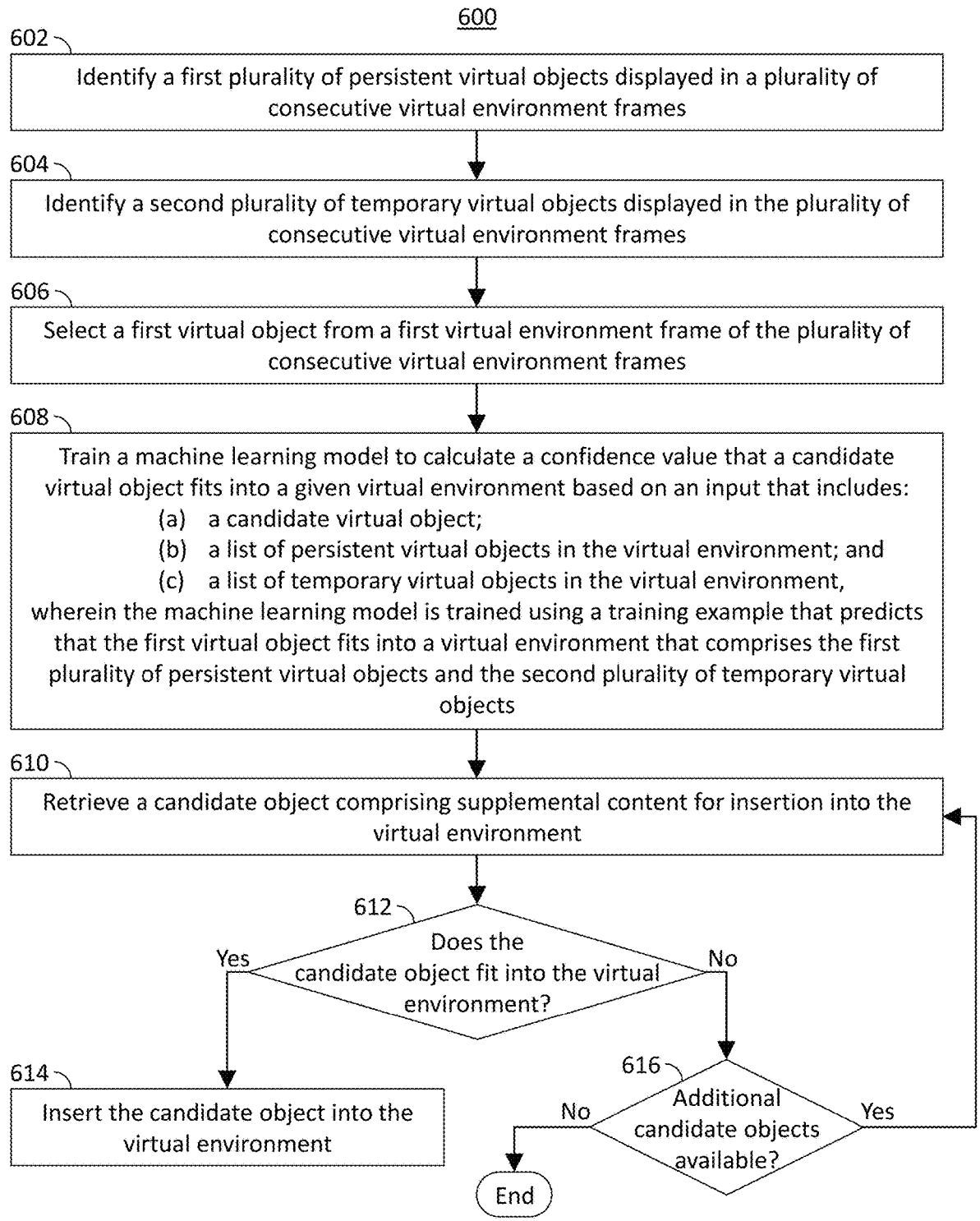
FIG. 6 is a flowchart representing a process for inserting a supplemental content item into a virtual environment using a machine learning model, in accordance with some embodiments of the disclosure.

FIG. 6 is a flowchart representing an illustrative process 600 for inserting a supplemental content item into a virtual environment using a machine learning model, in accordance with some embodiments of the disclosure. Process 600 may be implemented on control circuitry 504. In addition, one or more actions of process 600 may be incorporated into or combined with one or more actions of any other process or embodiment described herein.

At 602, control circuitry 504 identifies a first plurality of persistent virtual objects displayed in a plurality of consecutive virtual environment frames. At 604, control circuitry 504 identifies a second plurality of temporary virtual objects displayed in the plurality of consecutive virtual environment frames. These actions may be accomplished using methods described above in connection with FIG. 1.

At 606, control circuitry 504 selects a first virtual object from a first virtual environment frame of the plurality of virtual environment frames. At 608, control circuitry 504 trains machine learning model 520 to calculate a confidence value that a candidate virtual object fits into a given virtual environment based on an input that includes (a) a candidate object, (b) a list of persistent virtual objects in the virtual environment, and (c) a list of temporary virtual objects in the virtual environment. Multiple training examples can be created from the persistent and temporary virtual objects in order to better train machine learning model 520. In addition, machine learning model 520 may be updated with new training examples in order to ensure that machine learning model 520 accurately predicts the suitability of a given candidate object for the current virtual environment. For example, new training examples may be generated at predetermined intervals, such as five minutes. Alternatively or additionally, new training examples may be generated if the list of persistent virtual object or the list of temporary virtual objects changes by at least a threshold amount, such as 33%. Machine learning model 520 is trained using a training example that predicts that the first virtual object fits into a virtual environment that comprises the first plurality of persistent virtual objects and the second plurality of temporary virtual objects. This may be accomplished using methods described above in connection with FIGS. 1-5.

At 610, control circuitry 504, using transceiver circuitry 522, retrieves a candidate object comprising supplemental content for insertion into the virtual environment. The supplemental content may be any type of content that relates to the virtual environment. In some embodiments, the supplemental content may be an advertisement. For example, the virtual environment may include a road, and the candidate object be a car. The car object may by a particular type of car, such as a Porsche, and may further include an animation of a Porsche as though it were driving at a high speed. Transceiver circuitry 522 may transmit an SQL "SELECT" command to supplemental content database 526 and receive, in response to the transmitted command, a supplemental content item. At 612, control circuitry 504 feeds the candidate object into machine learning model 520 and determines whether the candidate object fits into the virtual environment. If control circuitry 504 determines that the candidate object fits into the virtual environment ("Yes" at 612), then, at 614, control circuitry 504 inserts the candidate object into the virtual environment. For example, machine learning model 520 may calculate a confidence value of 0.8 for the candidate object, indicating a strong likelihood that the candidate object fits into the virtual environment. Control circuitry 504 then inserts the candidate object into the virtual environment at a location that may be predetermined for placement of supplemental content, or dynamically selected by control circuitry 504, such as in a location in the current virtual environment frame where a user will see the supplemental content.

If control circuitry 504 determines that the candidate object does not fit into the virtual environment ("No" at 612), such as if machine learning model 520 calculates a confidence value of 0.2 for the candidate object, then, at 616, control circuitry 504 determines whether additional candidate objects are available. For example, the response from supplemental content database 526 may include more than one supplemental content item. If additional supplemental content items are available ("Yes" at 616), then processing returns to step 610, at which control circuitry 504 retrieves another candidate object to be fed into machine learning model 520. If no additional candidate objects are available ("No" at 616), then the process ends. Control circuitry 504 may wait a predetermined amount of time, or until the list of persistent objects and/or the list of temporary objects has sufficiently changed, before again performing process 600.

The actions and descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
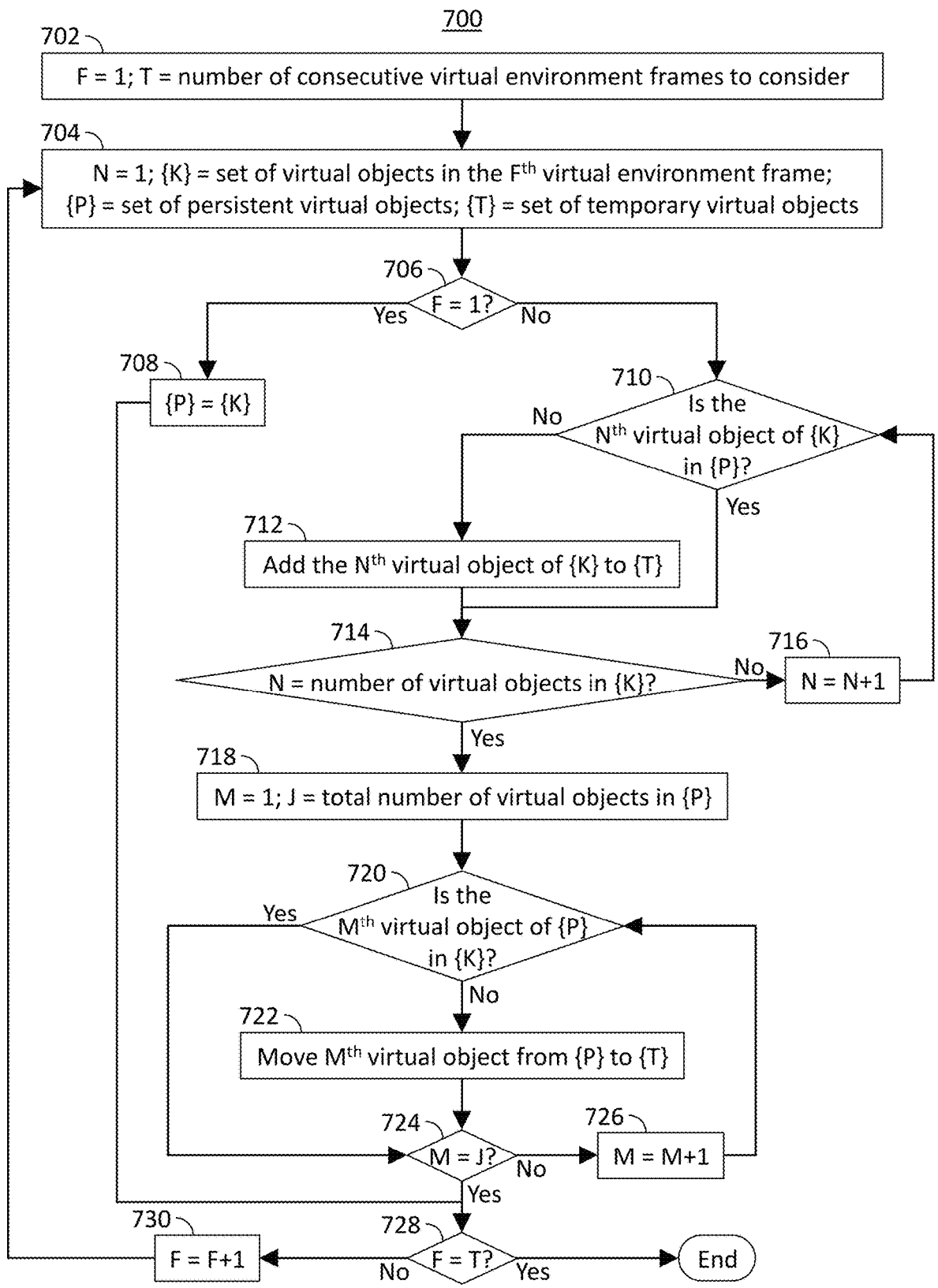
FIG. 7 is a flowchart representing a process for identifying persistent virtual objects and temporary virtual objects, in accordance with some embodiments of the disclosure.

FIG. 7 is a flowchart representing an illustrative process 700 for identifying persistent virtual objects (as described above in connection with step 602 of FIG. 6) and temporary virtual objects (as described above in connection with step 604 of FIG. 6), in accordance with some embodiments of the disclosure. Process 700 may be implemented on control circuitry 504. In addition, one or more actions of process 700 may be incorporated into or combined with one or more actions of any other process or embodiment described herein.

At 702, control circuitry 504 initializes a counter variable F, setting its value to one, and a variable T representing the number of consecutive virtual environment frames to consider. For example, to determine whether a given virtual object is temporary or persistent, control circuitry 504 must determine whether the given virtual object appears in more than one consecutive virtual environment frame. Thus, in determining whether virtual objects displayed in the virtual environment are persistent or temporary, control circuitry 504 may consider several consecutive virtual environment frames.

At 704, control circuitry 504 initializes a counter variable N, setting its value to one; a data set {K}, representing the set of virtual objects in the current virtual environment frame being considered (i.e., the $F^{th}$ virtual environment frame); a data set {P}, representing the set of persistent virtual objects determined to be displayed in the current virtual environment frame being considered; and a data set {T}, representing the set of temporary virtual objects determined to be displayed in the current virtual environment frame being considered.

At 706, control circuitry 504 determines whether F is equal to one, meaning that the current virtual environment frame being considered is the first virtual environment frame to be considered. If F is equal to one ("Yes" at 706), then, at 708, control circuitry 504 sets {P} equal to {K}, meaning that all virtual objects being displayed in the current virtual environment frame are persistent virtual objects. This is because control circuitry 504 currently has no basis on which to determine that any particular virtual object of set {K} is persistent or temporary, as the current virtual environment frame being considered is the first virtual environment frame to be considered. Processing then continues at step 728, described below.

If F is not equal to one ("No" at 706), meaning that at least one virtual environment frame has already been considered, then, at 710, control circuitry 504 determines whether the $N^{th}$ virtual object of set {K} is currently included in set {P}. A virtual object in the current virtual environment frame (i.e., a virtual object of set {K}) that is also included in set {P} reinforces that the virtual object is a persistent virtual object. However, if the virtual object is not included in set {P}, then the virtual object is, relative to all virtual environment frames previously considered, a new virtual object and is, therefore, a temporary virtual object. Thus, if the $N^{th}$ virtual object of set {K} is not in set {P} ("No" at 710), then, at 712, control circuitry 504 adds the $N^{th}$ virtual object to set {T}, indicating that it is a temporary virtual object.

After adding the $N^{th}$ virtual object to {T}, or if the $N^{th}$ virtual object of set {K} is in set {P} ("Yes" at 710), at 714, control circuitry 504 determines whether N is equal to the number of virtual objects in set {K}, meaning all virtual objects of set {K} have been processed. If N is not equal to the number of virtual objects in set {K} ("No" at 714), then, at 716, control circuitry 504 increments the value of N by one, and processing returns to step 710.

If N is equal to the number of virtual objects in set {K} ("Yes" at 714), then, at 718, control circuitry 504 initializes a counter variable M, setting its value to one, and a variable J representing the total number of virtual objects in set {P}. At 720, control circuitry 504 determines whether the $M^{th}$ virtual object of set {P} is included in set {K}. A virtual object that is included in set {P}, meaning that it was previously determined to be a persistent virtual object, that is not included in set {K}, meaning that it is no longer being displayed, means that the virtual object is not a persistent virtual object, but rather, a temporary virtual object. Thus, if control circuitry 504 determines that the $M^{th}$ virtual object in set {P} is not included in set {K}, ("No" at 720), then, at 722, control circuitry 504 moves the $M^{th}$ virtual object from set {P} to set {T}.

After moving the $M^{th}$ virtual object from set {P} to set {T}, or if the $M^{th}$ virtual object is included in set {K} ("Yes" at 720), meaning that the $M^{th}$ virtual object is still being displayed and is therefore still considered a persistent virtual object, processing continues at step 724. At 724, control circuitry 504 determines whether M is equal to J, meaning that all virtual objects in set {P} have been processed to determine if they are still considered persistent virtual objects. If M is not equal to J ("No" at 724), meaning there are additional virtual objects in set {P} to process, then, at 726, control circuitry 504 increments the value of M by one, and processing returns to step 720. If M is equal to J ("Yes" at 724) or after setting {P} equal to {K} during processing of the first consecutive virtual environment frame, at 728, control circuitry 504 determines whether F is equal to T. If F is not equal to T, meaning that there are additional virtual environment frames to consider, then, at 730, control circuitry 504 increments the value of F by one, and processing returns to step 704. If F is equal to T, meaning that all consecutive virtual environment frames have been considered, then the process ends.

The actions and descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
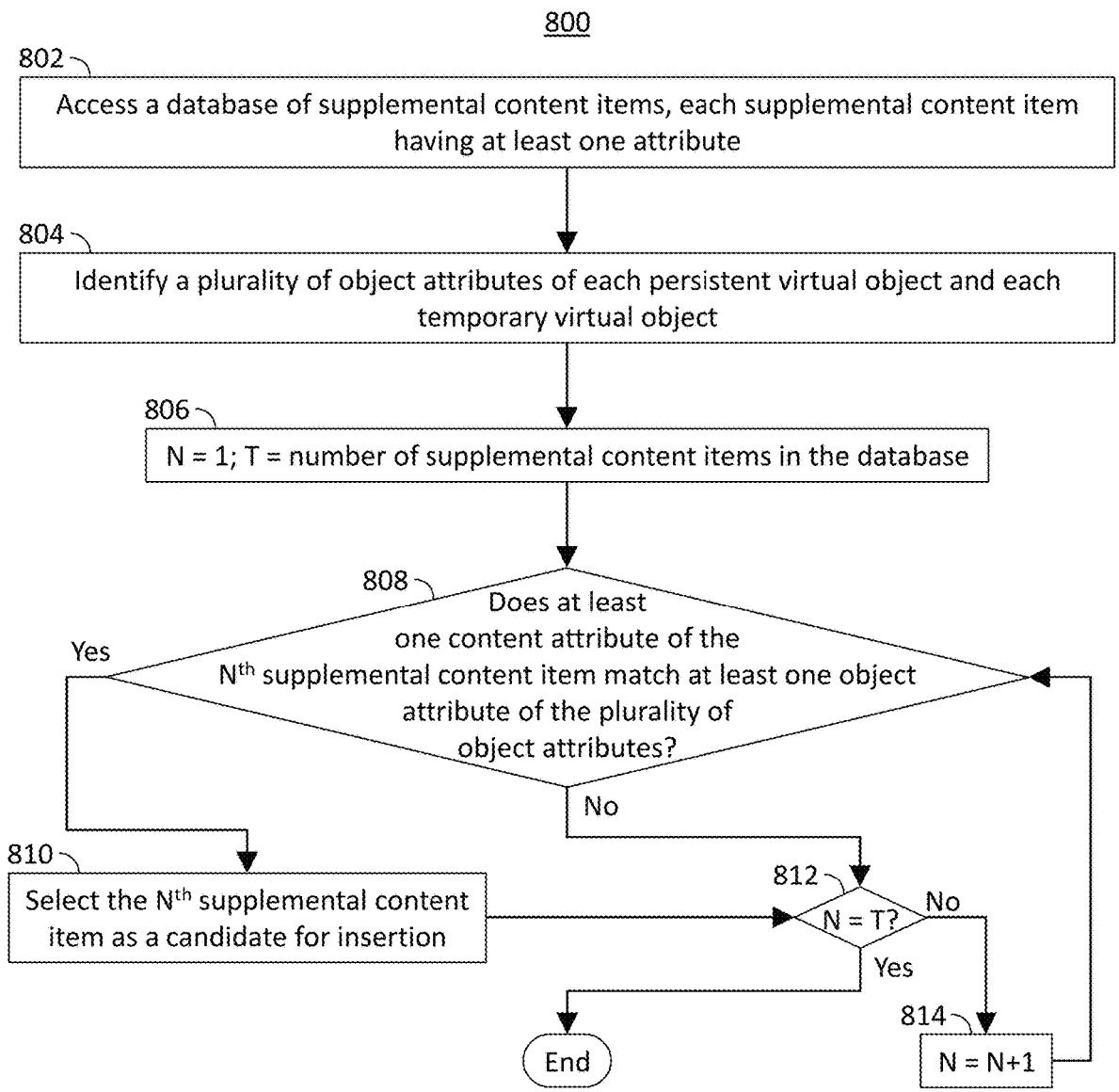
FIG. 8 is a flowchart representing a first process for selecting a supplemental content item as a candidate for insertion into a virtual environment, in accordance with some embodiments of the disclosure.

FIG. 8 is a flowchart representing a first illustrative process 800 for selecting a supplemental content item as a candidate for insertion into a virtual environment, in accordance with some embodiments of the disclosure. Process 800 may be implemented on control circuitry 504. In addition, one or more actions of process 800 may be incorporated into or combined with one or more actions of any other process or embodiment described herein.

At 802, control circuitry 504 accesses a database of supplemental content items, each supplemental content item having at least one attribute. For example, control circuitry 504, using transceiver circuitry 522, may access supplemental content database 526 and retrieve supplemental content items. Each supplemental content item may have attributes similar to those of persistent and temporary virtual objects displayed in the virtual environment as described above in connection with FIG. 3. At 804, control circuitry 504 identifies a plurality of object attributes of each persistent virtual object and each temporary virtual object displayed in the virtual environment, or in a set of consecutive virtual environment frames. For example, processes described above in connection with FIG. 7 may be used to identify persistent virtual objects and temporary virtual objects in the virtual environment. Each virtual object may have associated attributes that are separately retrievable by control circuitry 504 or can be extracted from virtual environment data.

At 806, control circuitry 504 initializes a counter variable N, setting its value to one, and a variable T representing the number of supplemental content items in the supplemental content database. At 808, control circuitry 504 determines whether at least one content attribute of the $N^{th}$ supplemental content item matches at least one object attribute of the plurality of object attributes of the persistent and temporary virtual objects. If so ("Yes" at 808), then, at 810, control circuitry 504 selects the $N^{th}$ supplemental content item from the database as a candidate for insertion into the virtual environment. After selecting the $N^{th}$ object as a candidate for insertion, or if no content attributes of the $N^{th}$ supplemental content item match any object attributes of the plurality of object attributes ("No" at 808), at 812, control circuitry 504 determines whether N is equal to T, meaning that all supplemental content items have been processed. If N is not equal to T ("No" at 812), then, at 814, control circuitry 504 increments the value of N by one, and processing returns to step 808. If N is equal to T ("Yes" at 812), then the process ends. The supplemental content items selected as candidates at 810 can then be fed into machine learning model 520 to determine if any of the candidates fit into the virtual environment.

The actions and descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
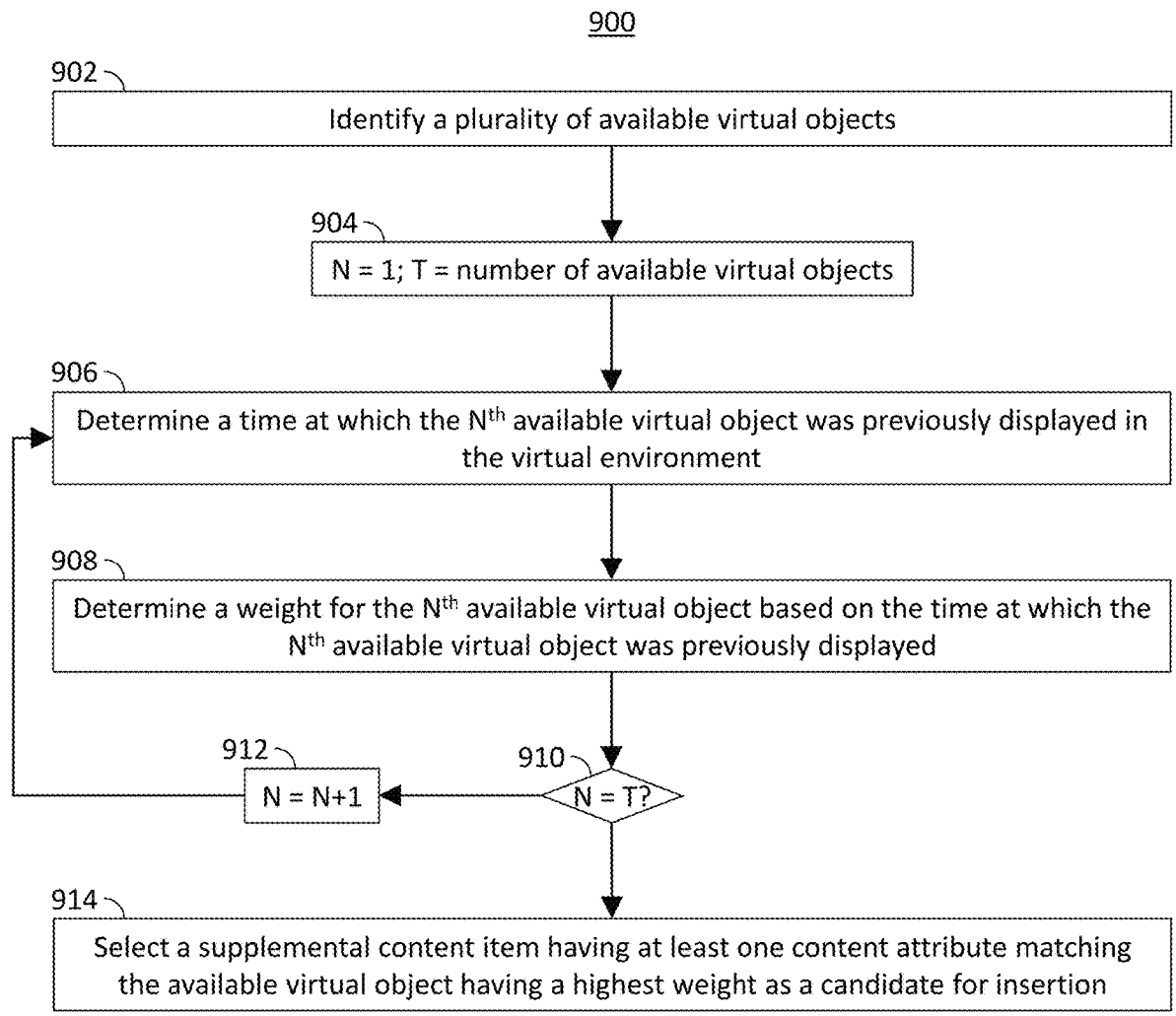
FIG. 9 is a flowchart representing a second process for selecting a supplemental content item as a candidate for insertion into a virtual environment, in accordance with some embodiments of the disclosure.

FIG. 9 is a flowchart representing a second illustrative process 900 for selecting a supplemental content item as a candidate for insertion into a virtual environment, in accordance with some embodiments of the disclosure. Process 900 may be implemented on control circuitry 504. In addition, one or more actions of process 900 may be incorporated into or combined with one or more actions of any other process or embodiment described herein.

At 902, control circuitry 504 identifies a plurality of available virtual objects. For example, the virtual environment may have of a predefined set of virtual objects that can be displayed therein. At 904, control circuitry 504 initializes a counter variable N, setting its value to one, and a variable T representing the number of available virtual objects. At 906, control circuitry 504 determines a time at which the $N^{th}$ available virtual object was previously displayed in the virtual environment. For example, a temporary virtual object may have last been displayed in the virtual environment thirty seconds ago, one minute ago, five minutes ago, or any amount of time between the current time and the time at which display of the virtual environment began. At 908, control circuitry 504 determines a weight for the $N^{th}$ available virtual object based on the time at which the $N^{th}$ available virtual object was previously displayed. The weight assigned to the $N^{th}$ object increases as the time at which the $N^{th}$ available virtual object was last displayed approaches the current time. In other words, the more recently a virtual object was displayed, the more likely it is that the object or a similar object (e.g., a supplemental content item) would fit into the virtual environment. The weight of each virtual object may be used in training examples as well, whereby the target confidence level for a candidate object is proportional to the weight assigned to that object. At 910, control circuitry 504 determines whether N is equal to T, meaning that all available virtual objects have been processed. If N is not equal to T ("No" at 910), then, at 912, control circuitry 504 increments the value of N by one, and processing returns to step 906. If N is equal to T ("Yes" at 910), then, at 914, control circuitry 504 selects a supplemental content item having at least one content attribute matching the available virtual object having the highest weight as a candidate for insertion. The candidate object can then be fed into machine learning model 520 to determine whether the candidate object fits into the virtual environment.

The actions and descriptions of FIG. 9 may be used with any other embodiment of this disclosure. In addition, the actions and descriptions described in relation to FIG. 9 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for determining supplemental content to insert into a virtual environment, the method comprising:
    identifying a first plurality of persistent virtual objects based on virtual environment information;
    identifying a second plurality of temporary virtual objects based on the virtual environment information;
    determining that one or more virtual objects from the virtual environment information are suitable as part of a virtual environment comprising the first plurality of persistent virtual objects and the second plurality of temporary virtual objects; and
    training a machine learning model based on the determining that the one or more virtual objects are suitable in the virtual environment, wherein the trained machine learning model provides a confidence value indicating whether a candidate virtual object is suitable for a given virtual environment based on input data comprising (a) the candidate virtual object, (b) a list of persistent virtual objects in the given virtual environment, and (c) a list of temporary virtual objects in the given virtual environment.

2. The method of claim 1, wherein the determining that the one or more virtual objects are suitable as part of the virtual environment comprises:
    selecting a first virtual object from the virtual environment information; and
    generating a training example that predicts that the selected first virtual object fits in the virtual environment comprising the first plurality of persistent virtual objects and the second plurality of temporary virtual objects.

3. The method of claim 1, wherein the determining that the one or more virtual objects are suitable as part of the virtual environment comprises:
    selecting a virtual object of the one or more virtual objects; and
    determining a confidence weight for the selected virtual object based on how recent the selected virtual object was displayed in the virtual environment.

4. The method of claim 1, wherein the virtual environment information comprises a plurality of consecutive virtual environment frames, and wherein the persistent virtual objects and the temporary virtual objects are identified from virtual objects displayed in the plurality of consecutive virtual environment frames.

5. The method of claim 4, further comprising:
    identifying as the first plurality of persistent virtual objects all virtual objects displayed in a first virtual environment frame of the plurality of consecutive virtual environment frames; and
    for each other virtual environment frame of the plurality of consecutive virtual environment frames:
        comparing the first plurality of persistent virtual objects with a third plurality of virtual objects displayed in the respective virtual environment frame;
        in response to determining, based on the comparing, that the first plurality of persistent virtual objects does not include a virtual object of the third plurality of virtual objects, identifying the respective virtual object of the third plurality of virtual objects as a temporary virtual object; and
        in response to determining that the third plurality of virtual objects does not include a persistent virtual object of the plurality of persistent virtual objects, reidentifying the respective persistent virtual object as a temporary virtual object.

6. The method of claim 1, wherein the virtual environment comprises an augmented reality (AR) overlay from an AR display device, and wherein the confidence value indicates whether the candidate virtual object is suitable for the AR overlay.

7. The method of claim 1, further comprising generating, based on the virtual environment information, virtual object metadata comprising object attributes that describe each persistent virtual object and each temporary virtual object.

8. The method of claim 1, wherein the virtual environment information comprises a list of virtual objects depicted from a first time to a second time in the virtual environment.

9. The method of claim 1, further comprising:
    determining, based on the confidence value from the trained machine learning model, whether a selected candidate object is suitable to be inserted into a second virtual environment as supplemental content.

10. The method of claim 1, wherein the virtual environment information describes all virtual objects in a field of view from a display device on which the virtual environment is displayed.

11. A system for determining supplemental content to insert into a virtual environment, the system comprising:
    input/output circuitry configured to access virtual environment information; and
    control circuitry configured to:
        identify a first plurality of persistent virtual objects based on the virtual environment information;
        identify a second plurality of temporary virtual objects based on the virtual environment information;
        determine that one or more virtual objects from the virtual environment information are suitable as part of a virtual environment comprising the first plurality of persistent virtual objects and the second plurality of temporary virtual objects; and
        train a machine learning model based on the determining that the one or more virtual objects are suitable in the virtual environment, wherein the trained machine learning model provides a confidence value indicating whether a candidate virtual object is suitable for a given virtual environment based on input data comprising (a) the candidate virtual object, (b) a list of persistent virtual objects in the given virtual environment, and (c) a list of temporary virtual objects in the given virtual environment.

12. The system of claim 11, wherein the control circuitry, when determining that the one or more virtual objects are suitable as part of the virtual environment, is configured to:
   select a first virtual object from the virtual environment information; and
   generate a training example that predicts that the selected first virtual object fits in the virtual environment comprising the first plurality of persistent virtual objects and the second plurality of temporary virtual objects.

13. The system of claim 11, wherein the control circuitry, when determining that the one or more virtual objects are suitable as part of the virtual environment, is configured to:
   select a virtual object of the one or more virtual objects; and
   determine a confidence weight for the selected virtual object based on how recent the selected virtual object was displayed in the virtual environment.

14. The system of claim 11, wherein the virtual environment information comprises a plurality of consecutive virtual environment frames, and wherein the control circuitry is configured to identify the persistent virtual objects and the temporary virtual objects from virtual objects displayed in the plurality of consecutive virtual environment frames.

15. The system of claim 14, wherein the control circuitry is further configured to:
   identify as the first plurality of persistent virtual objects all virtual objects displayed in a first virtual environment frame of the plurality of consecutive virtual environment frames; and
   for each other virtual environment frame of the plurality of consecutive virtual environment frames:
      compare the first plurality of persistent virtual objects with a third plurality of virtual objects displayed in the respective virtual environment frame;
      in response to determining, based on comparing the first plurality of persistent virtual objects with the third plurality of virtual objects, that the first plurality of persistent virtual objects does not include a virtual object of the third plurality of virtual objects, identify the respective virtual object of the third plurality of virtual objects as a temporary virtual object; and
      in response to determining that the third plurality of virtual objects does not include a persistent virtual object of the plurality of persistent virtual objects, reidentify the respective persistent virtual object as a temporary virtual object.

16. The system of claim 11, wherein the virtual environment comprises an augmented reality (AR) overlay from an AR display device, and wherein the confidence value indicates whether the candidate virtual object is suitable for the AR overlay.

17. The system of claim 11, wherein the control circuitry is further configured to generate, based on the virtual environment information, virtual object metadata comprising object attributes that describe each persistent virtual object and each temporary virtual object.

18. The system of claim 11, wherein the virtual environment information comprises a list of virtual objects depicted from a first time to a second time in the virtual environment.

19. The system of claim 11, wherein the control circuitry is further configured to:
   determine, based on the confidence value from the trained machine learning model, whether a selected candidate object is suitable to be inserted into a second virtual environment as supplemental content.

20. The system of claim 11, wherein the virtual environment information describes all virtual objects in a field of view from a display device on which the virtual environment is displayed.

* * * * *